United States Patent
Zhong et al.

(10) Patent No.: US 11,062,471 B1
(45) Date of Patent: Jul. 13, 2021

(54) NEURAL NETWORK SYSTEM FOR STEREO IMAGE MATCHING

(71) Applicant: NVIDIA Corporation, Santa Clara, CA (US)

(72) Inventors: Yiran Zhong, Macquarie (AU); Wonmin Byeon, Santa Clara, CA (US); Charles Loop, Mercer Island, WA (US); Stanley Thomas Birchfield, Sammamish, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/868,342

(22) Filed: May 6, 2020

(51) Int. Cl.
*G06K 9/00* (2006.01)
*G06T 7/593* (2017.01)

(52) U.S. Cl.
CPC .... *G06T 7/593* (2017.01); *G06T 2207/10021* (2013.01); *G06T 2207/20081* (2013.01); *G06T 2207/20084* (2013.01); *G06T 2207/20228* (2013.01)

(58) Field of Classification Search
CPC ........... G06T 7/593; G06T 2207/10021; G06T 2207/20081; G06T 2207/20084; G06T 2207/20228
USPC ........................................................ 382/154
See application file for complete search history.

(56) References Cited

U.S. PATENT DOCUMENTS 10,313,650 B2 * 6/2019 Lim ..................... H04N 13/257
10,380,753 B1 * 8/2019 Csordas ............... G06K 9/6202

OTHER PUBLICATIONS

Rao, Zhibo, et al. "MSDC-Net: Multi-scale dense and contextual networks for automated disparity map for stereo matching." arXiv preprint arXiv:1904.12658 (2019). (Year: 2019).*

Duggal, Shivam, et al. "Deeppruner: Learning efficient stereo matching via differentiable patchmatch." Proceedings of the IEEE/CVF International Conference on Computer Vision. 2019. (Year: 2019).*

Gu, Xiaodong, et al. "Cascade cost volume for high-resolution multi-view stereo and stereo matching." Proceedings of the IEEE/CVF Conference on Computer Vision and Pattern Recognition. 2020. (Year: 2020).*

Kang, Junhua, et al. "Improving disparity estimation based on residual cost volume and reconstruction error volume." The International Archives of Photogrammetry, Remote Sensing and Spatial Information Sciences 43 (2020): 135-142. (Year: 2020).*

(Continued)

*Primary Examiner* — Jonathan S Lee
(74) *Attorney, Agent, or Firm* — Leydig, Voit & Mayer, Ltd.

(57) ABSTRACT

Stereo matching generates a disparity map indicating pixels offsets between matched points in a stereo image pair. A neural network may be used to generate disparity maps in real time by matching image features in stereo images using only 2D convolutions. The proposed method is faster than 3D convolution-based methods, with only a slight accuracy loss and higher generalization capability. A 3D efficient cost aggregation volume is generated by combining cost maps for each disparity level. Different disparity levels correspond to different amounts of shift between pixels in the left and right image pair. In general, each disparity level is inversely proportional to a different distance from the viewpoint.

20 Claims, 13 Drawing Sheets

(56) References Cited

OTHER PUBLICATIONS

Liang, Zhengfa, et al. "Stereo matching using multi-level cost volume and multi-scale feature constancy." IEEE transactions on pattern analysis and machine intelligence (2019). (Year: 2019).*

Wu, Zhenyao, et al. "Semantic stereo matching with pyramid cost volumes." Proceedings of the IEEE/CVF International Conference on Computer Vision. 2019. (Year: 2019).*

Yang, Jiayu, et al. "Cost volume pyramid based depth inference for multi-view stereo." Proceedings of the IEEE/CVF Conference on Computer Vision and Pattern Recognition. 2020. (Year: 2020).*

Yee, Kyle, and Ayan Chakrabarti. "Fast Deep Stereo with 2D Convolutional Processing of Cost Signatures." Proceedings of the IEEE/CVF Winter Conference on Applications of Computer Vision. 2020. (Year: 2020).*

Zhang, Yaru, et al. "Attention-guided aggregation stereo matching network." Image and Vision Computing 106 (2021): 104088. (Year: 2021).*

* cited by examiner

NEURAL NETWORK SYSTEM FOR STEREO IMAGE MATCHING

TECHNICAL FIELD

The present invention relates to stereo image matching, and more particularly to using a deep neural network to match features in stereo images using two-dimensional convolutions.

BACKGROUND

Conventional techniques for stereo matching, such as using a neural network to generate a disparity map between left and right images in a stereo image pair, are computationally expensive and cannot reliably be performed in real time. The main reason for this high computational expense is the use of three-dimensional (3D) convolutions to process a four-dimensional (4D) stereo image feature volume (height×width×disparity levels×number of features). Such a feature volume contains concatenated pairs of feature vectors from left and right input images offset by the disparity level. A common way to speed up the computation is to downsample the feature volume. However, downsampling may result in a loss of high frequency details.

Another drawback to using 3D convolutions on a 4D feature volume is that it brings disparity information into the matching process. Specifically, the neural network may learn spurious connections between spatial information and disparities, which may not apply to data with a different distribution. While there may be some benefits to considering disparity in cost computation, e.g., in boundary areas where the color of the foreground and background may be similar while the disparity is different, finding matching points between stereo image pairs is fundamentally a two-dimensional (2D) problem. There is a need for addressing these issues and/or other issues associated with the prior art.

SUMMARY

Stereo matching generates a disparity map indicating pixels offsets between matched points in a stereo image pair. A neural network may be used to generate disparity maps in real time by matching image features in stereo images using only 2D convolutions. The proposed method is faster than 3D convolution-based methods, with only a slight accuracy loss and higher generalization capability. A 3D efficient cost aggregation volume is generated by combining cost maps for each disparity level. Different disparity levels correspond to different amounts of shift between pixels in the left and right image pair. In general, each disparity level is inversely proportional to a different distance from the viewpoint.

A method, computer readable medium, and system are disclosed for stereo matching. A first feature map is extracted from a first image in a stereo image pair and second feature maps are extracted from a second image in the stereo image pair, where each second feature map corresponds to a different disparity level in a set of disparity levels. For each disparity level, the first feature map and the second feature map associated with the disparity level are processed by a matching neural network to produce a cost map for the disparity level and the cost maps are combined to produce a cost volume for the stereo image pair.

DETAILED DESCRIPTION

The neural network model for stereo image matching learns to match costs between pairs of 2D feature maps to produce 2D cost maps for each of a plurality of disparity levels. Different disparity levels correspond to different amounts of shift between pixels in the left and right stereo image pair. In general, each disparity level is associated with a different distance from the viewpoint. The output of the stereo matching neural network system is a disparity map indicating a disparity value for each pixel for a pair of stereo images. Generally, the disparity value corresponds to depth or distance (disparity is actually inversely proportional to depth) from a viewpoint (e.g., camera) to an object visible at the pixel in an image captured by the camera. More familiar, the human brain processes images from the left and right eyes to determine how far away objects are. The disparity map may be used for stereo camera-based systems including, but not limited to robotics, drones, autonomous vehicles, intelligent video analytics, augmented reality, virtual reality, computer aided design (CAD), and more.

Computation speed is important so that the disparity maps may be computed in real-time, particularly for navigation and/or decision-making applications that are time sensitive, such as autonomous driving, robotic manufacturing, and the like. The ability of a neural network system to adapt to different situations and environments is referred to as generalization. Because the variety of data which is available for training the neural network system may be limited, a neural network system that can generalize is more versatile. For example, a stereo matching neural network system that is trained using sunny daytime scenes may be able to generalize, and accurately predict disparity maps for rainy daytime scenes.

A neural network model may learn to match features in stereo images using only 2D convolutions instead of applying 3D convolutions to a 4D feature volume. In contrast, conventional solutions apply time-consuming 3D convolutions to a 4D feature volume. Using 2D convolutions is significantly faster than 3D convolution-based techniques, with only a slight accuracy loss and higher generalization capability. In contrast with conventional techniques, a 3D efficient cost aggregation volume is generated by combining the 2D cost maps corresponding to the plurality of disparity levels. The 3D cost volume is then processed to generate a disparity map for each stereo image pair. Using the 3D cost volume provides more accurate results compared with conventional 2D convolution-based solutions that directly learn context mapping between inputs and disparity maps. In addition, a refinement network can be utilized to further improve the disparity map generated from the 3D cost volume.

Figure 1A:
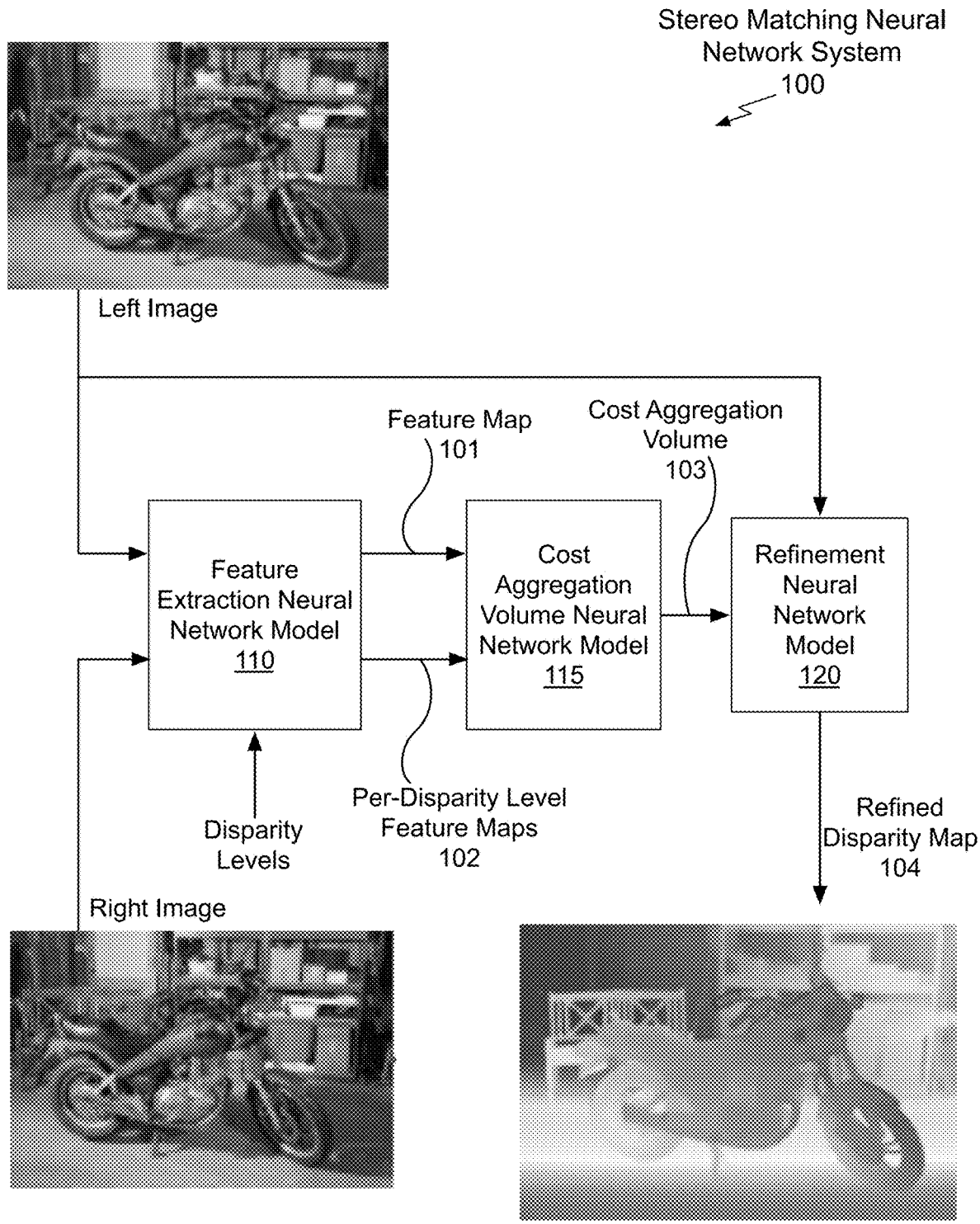
FIG. 1A illustrates a block diagram of a stereo matching neural network system, in accordance with an embodiment.

FIG. 1A illustrates a block diagram of a stereo matching neural network system 100, in accordance with an embodiment. The stereo matching neural network system 100 includes a feature extraction neural network model 110, an efficient cost aggregation volume neural network model 115, and a refinement neural network model 120. Although the stereo matching neural network system 100 is described in the context of processing units, one or more of the extraction neural network model 110, cost aggregation volume neural network model 115, and refinement neural network model 120 may be performed by a program, custom circuitry, or by a combination of custom circuitry and a program. For example, the cost aggregation volume neural network model 115 may be implemented by a GPU (graphics processing unit), CPU (central processing unit), or any processor capable of implementing a neural network model. In an embodiment, the stereo matching neural network system 100 utilizes specialized tensor cores within a GPU, such as the tensor cores within the PPU 300 shown in FIG. 3. Furthermore, persons of ordinary skill in the art will understand that any system that performs the operations of the stereo matching neural network system 100 is within the scope and spirit of embodiments of the present invention.

Each stereo image pair includes a left and right image pair for viewing by a left and right eye, respectively. The feature extraction neural network model 110 receives the stereo image pair and extracts a feature map 101 from the left image. The feature extraction neural network model 110 extracts per-disparity level feature maps 102 from the right image, where each "right" feature map corresponds to a different disparity level (d). In other words, pixels (p) in the right image are spatially offset within the image plane for each disparity level (p-d) to generate the per-disparity level feature maps 102. For example, when d is a number of pixels, the right image is horizontally shifted by the number of pixels and input to the feature extraction neural network model 110. In other embodiments, the feature map 101 is generated from the right image and the per-disparity level feature maps 102 are generated from the left image.

Generally, a deeper (i.e., more layers) neural network has a larger field of view and can extract richer information. Typically, more than 15 layers may be used for feature extraction. However, when considering the trade-off between runtime and accuracy, adding more layers in the feature extraction neural network model 110 may not be the best option for the stereo matching task. In an embodiment, the feature extraction neural network model 110 is implemented using a shallow structure that contains 8 convolutional layers. The feature extraction neural network model 110 may be configured to generate one or more feature maps 101 and/or 102 in parallel for the stereo image pair.

In an embodiment, each image in the stereo image pair is downsampled using a 3×3 convolution with a stride of 3 and then two dilated convolutions are applied to enlarge the receptive field. A reduced spatial pyramid pooling (SPP) module may be used to combine features from different scales to relieve the fixed-size constraint of a convolutional neural network (CNN). In an embodiment, the SPP module contains two average pooling layers: 64×64 and 16×16, and each average pooling layer follows a 1×1 convolution and a bilinear upsampling layer. Feature maps that are input to the SPP module may be concatenated and a 3×3 convolution is used to reduce the channel size to 96. The final feature map (32 channels) may be generated by 1×1 convolution without batch normalization and activation functions.

The cost aggregation volume neural network model 115 comprises an encoder-decoder matching neural network that learns to match pixels between pairs of left and right 2D feature maps to build a cost volume 103. The single "left" feature map is paired with each of the "right" per-disparity level feature maps and each pair of feature maps is processed by the matching neural network to produce a cost map for the disparity level. The cost maps for the different disparity levels are aggregated to produce the 3D cost volume 103. Importantly, the pairs of feature maps can be processed independently and in parallel using the same matching neural network, as further described in conjunction with FIG. 1C.

In contrast, conventional solutions process a 4D feature volume (height×width×disparity levels×number of features) using 3D convolutions. Because color information is, for the most part, independent from geometry, the neighboring pixels' disparities are not considered when the cost aggregation volume neural network model 115 computes the matching cost for a pixel. Therefore, the cost maps may be independently computed for each disparity level and the cost maps are each disparity-invariant. For example, moving an object in a scene will not change its appearance (at least not in a systematic, scene-independent manner). As a result, using a 4D feature volume causes the network to learn spurious connections between spatial information and disparities, which may not apply to data with a different distribution. While there may be some benefits to considering disparity in cost computation, e.g., in boundary areas where the color of the foreground and background may be similar while the disparity is different, finding matching points between stereo image pairs is fundamentally a 2D problem.

After the cost volume 103 is constructed by the cost aggregation volume neural network model 115, a projection layer within the refinement neural network model 120 selects the disparity level with the highest matching cost. In an embodiment, a soft-argmin operation is used to generate a disparity map. The refinement neural network model 120 also generates an entropy map to reflect the confidence of each pixel. A softmax operation is applied to the cost volume 103 to convert it to a probability distribution before the entropy map is computed. The entropy map provides confidence or error information with less computation compared with conventional techniques. An entropy map and corresponding probability distribution is shown in FIG. 1B.

The refinement neural network model 120 processes the left image, the entropy map, and the disparity map to produce a refined disparity map 104. Compared with the refined disparity map 104, the disparity map generated by the soft-argmin operation is considered a coarse disparity map. Brighter regions in the refined disparity map 104 correspond to higher disparity values and darker regions correspond to lower disparity values.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
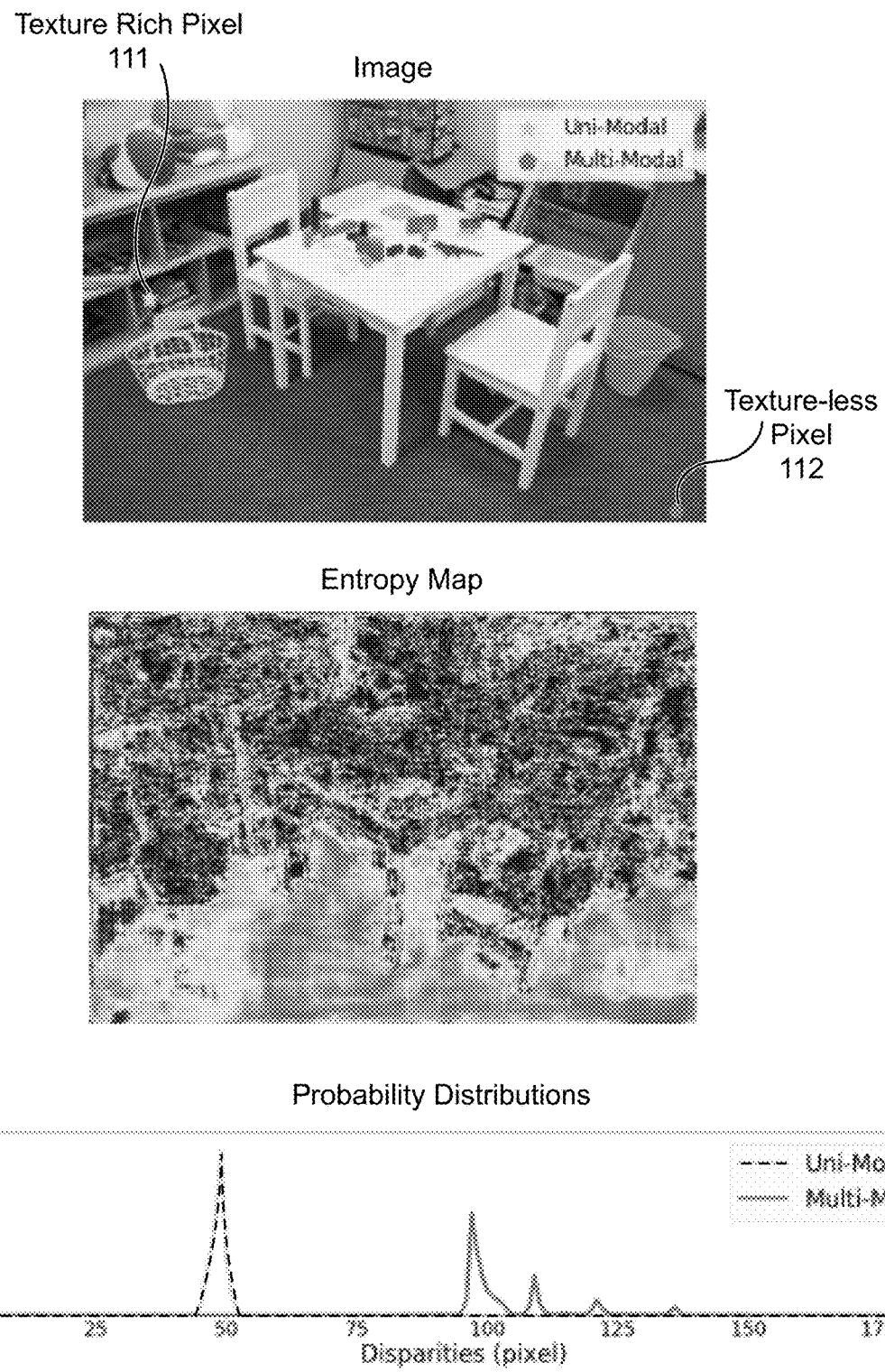
FIG. 1B illustrates an image, an entropy map, and probability distribution generated by the stereo matching neural network system of FIG. 1A, in accordance with an embodiment.

FIG. 1B illustrates an image, an entropy map, and probability distribution generated by the stereo matching neural network system 100 of FIG. 1A, in accordance with an embodiment. Two pixels in the left image, a texture rich pixel 111 and a texture-less pixel 112, are used to illustrate the relationship between entropy and the post-softmax probability distribution. The graph illustrates the post-softmax probability distribution curves for the two pixels. Pixels in the texture-less areas (e.g., the carpeted floor of the image) have high entropy whereas the pixels on the texture-rich areas (e.g., the shelves) have low entropy. When the probability curve is uni-modal, the pixel has a low entropy which corresponds to high confidence. When the probability curve is multimodal, the entropy of the curve is high, and the refinement neural network model 120 will have low confidence for the estimated disparities.

The cost volume 103 is essentially a volume of height× width×disparity levels, where each voxel is a scalar value that represents a confidence level that a pixel at location height×width in the left image corresponds to geometry located at disparity level d. Therefore, the probability distributions of FIG. 1B represent a plot of the set of values in the cost volume 103 for a given pixel and indicates the level of confidence that the stereo matching neural network system 100 has that the pixel is associated with each disparity level.

Figure 1C:
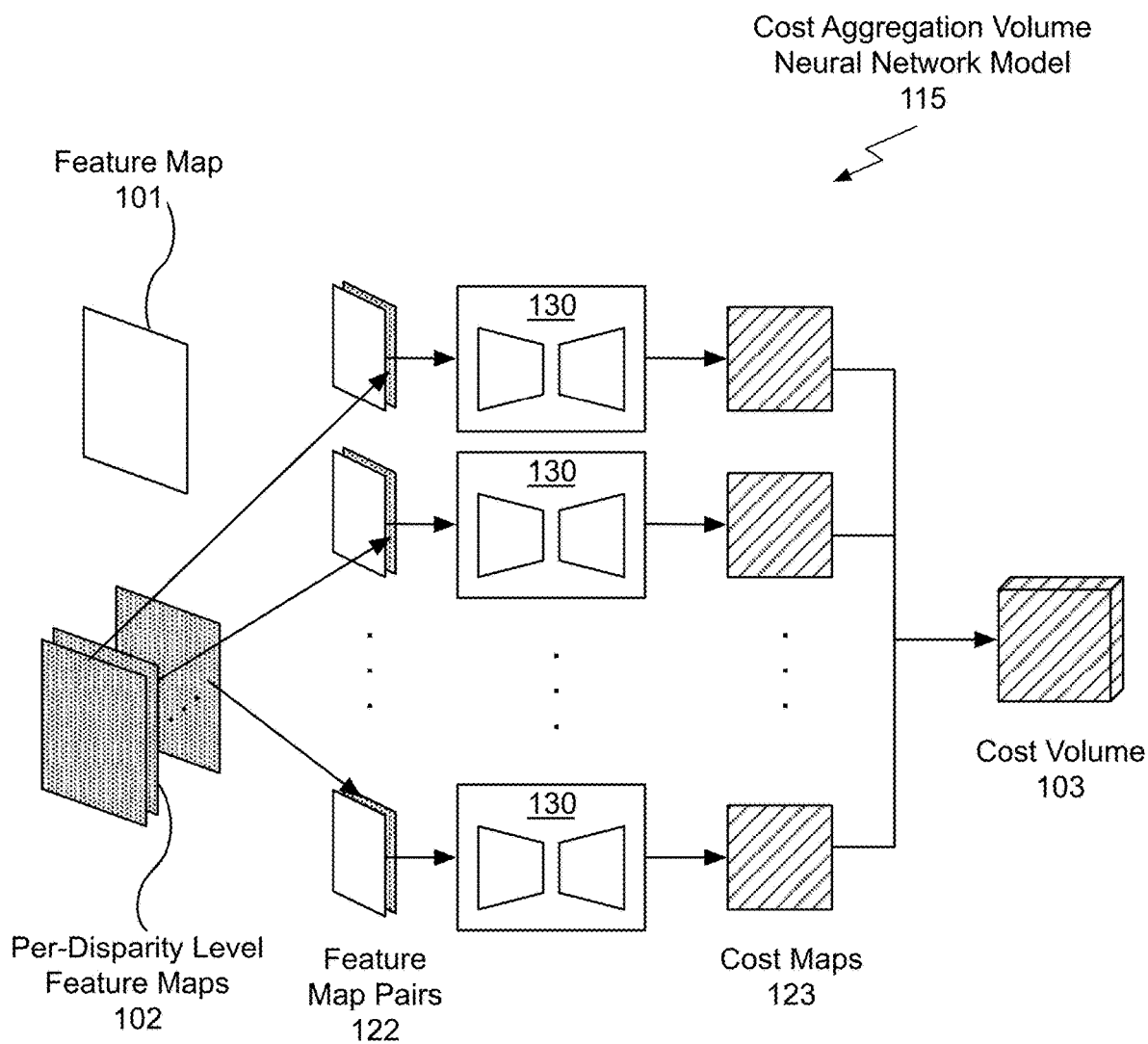
FIG. 1C illustrates a block diagram of the efficient cost aggregation volume neural network model from FIG. 1A, in accordance with an embodiment.

FIG. 1C illustrates a block diagram of the cost aggregation volume neural network model 115 from FIG. 1A, in accordance with an embodiment. A matching neural network 130 is used to compute a cost map at each disparity level. Each feature map pair 122 includes the single feature map 101 and one of the per-disparity level feature maps 102, and the feature maps may be concatenated and processed serially (not shown) or in parallel. The matching neural network 130 uses 2D convolutions to compute costs and learn cost aggregation. Since cost computations and aggregations on each disparity level are independent, the cost aggregation volume neural network model 115 can achieve real-time inference speed by leveraging parallel execution.

In an embodiment, the matching neural network 130 is a skip connected U-Net with a total of 17 convolutional layers, where each concatenated feature map is downsampled four times using 3×3 convolutions with a stride of 2. For each scale, the feature maps are filtered with one 3×3 convolution followed by a batch normalization layer and a rectified linear unit (ReLU) activation layer. In an embodiment, the feature size of each scale is set at 48, 64, 96 and 128 respectively. For upsampling layers, 4×4 deconvolution layers may be used with a stride of 2 and the feature dimension may be reduced accordingly. In an embodiment, a 3×3 convolutional layer with feature size of 1, with no batch normalization nor activation is applied by the matching neural network 130 to generate each cost map. The cost maps 123 may be combined by concatenation to construct the cost volume 103.

Figure 1D:
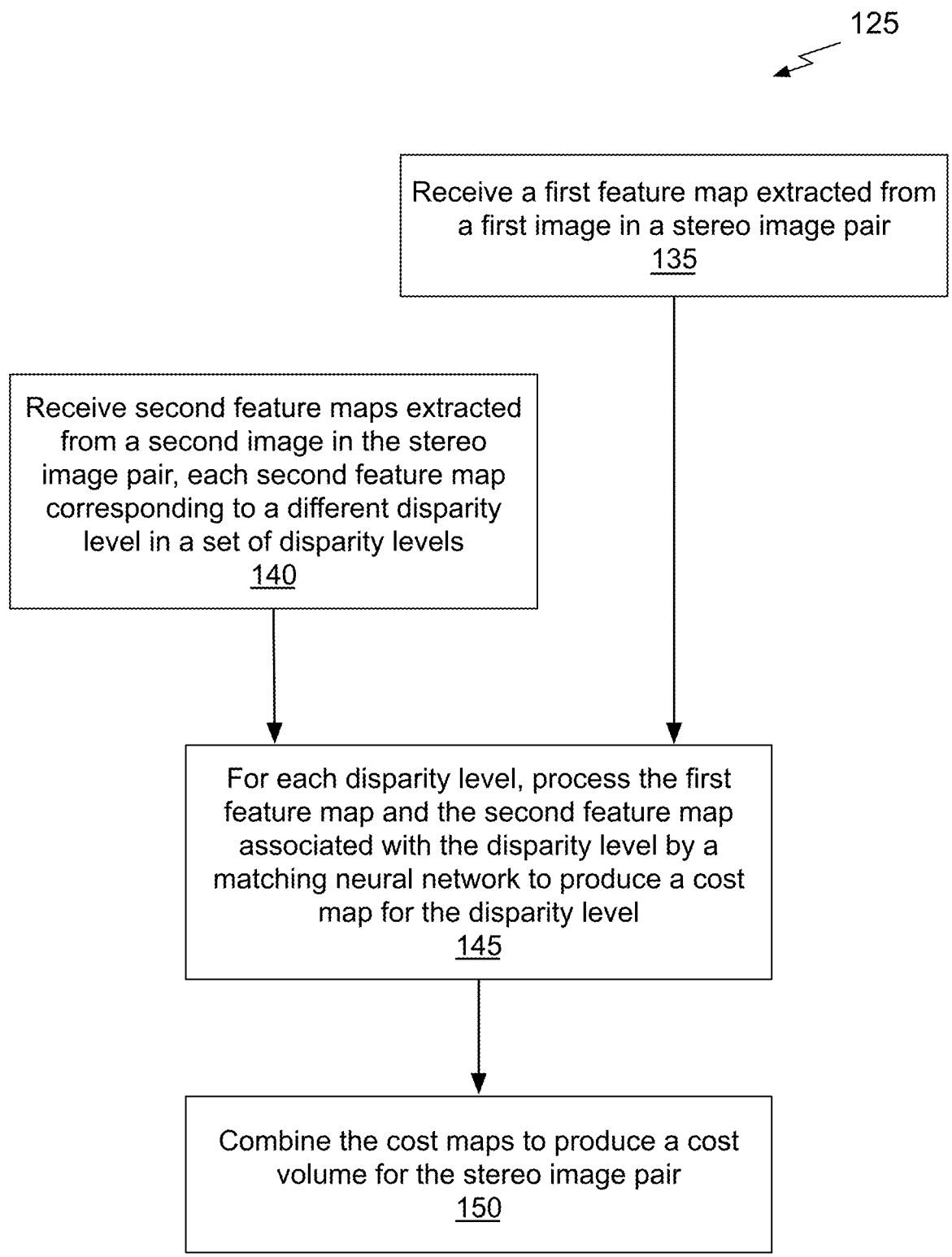
FIG. 1D illustrates a flowchart of a method for constructing an efficient cost aggregation volume, in accordance with an embodiment.

FIG. 1D illustrates a flowchart of a method 125 for constructing an efficient cost aggregation volume 103, in accordance with an embodiment. Although method 125 is described in the context of a processing unit, the method 125 may also be performed by a program, custom circuitry, or by a combination of custom circuitry and a program. For example, the method 125 may be executed by a GPU (graphics processing unit), CPU (central processing unit), or any processor capable of implementing at least a portion of the stereo matching neural network system 100. Furthermore, persons of ordinary skill in the art will understand that any system that performs method 125 is within the scope and spirit of embodiments of the present invention.

At step 135, a first feature map is received by the cost aggregation volume neural network model 115. In an embodiment, the first feature map is extracted from a first image in a stereo image pair by the feature extraction neural network model 110 within the stereo matching neural network system 100. In an embodiment, the first image is the left image. In the context of the following description, a stereo image pair may include image data or other types of data. In an embodiment, the stereo image pair comprises pairs of image frames rendered from two different viewpoints (e.g., left and right eye viewpoints).

At step 140, second feature maps are received by the cost aggregation volume neural network model 115. In an embodiment, the second feature maps are extracted from a second image in the stereo image pair by the feature extraction neural network model 110, where each second feature map corresponds to a different disparity level in a set of disparity levels.

At step 145, for each disparity level in the set, the first feature map and the second feature map associated with the disparity level is processed by the matching neural network 130 to produce a cost map for the disparity level. At step 150, the cost aggregation volume neural network model 115 combines the cost maps 123 to produce a cost volume 103 for the stereo image pair.

Conventional volumetric methods construct a 4D feature volume and process it with 3D convolutions. Mathematically, the matching cost for pixel p at disparity level d is formulated as:

$$c_{3D}(p,d)=g_{3D}(\phi_{4D}(f(I^L(p))\|f(I^R(p-d)))), \quad \text{Eq. (1)}$$

where f(•) is a feature network to convert images to feature maps, $\phi_{4D}$ (• ∥ •) denotes the concatenation of disparity-shifted feature map pairs on every possible disparity level, and $g_{3D}$ is a 3D convolution-based matching neural network that computes and aggregates the matching cost based on feature maps and neighboring disparity levels.

The proposed efficient cost aggregation (ECA) uses 2D convolutions instead of 3D convolutions. Instead of jointly regularizing the spatial and disparity domains using 3D convolutions, the matching cost is learned from spatial information through 2D convolutions. As a result, the learned cost is independent from the disparity level.

Specifically, consider a matching cost computation for pixel p at disparity level d. A conventional way of computing the cost is sum-of-squared differences:

$$c_{SSD}(p,d)=\Sigma_{\mathbf{q}\in\mathcal{N}_\mathbf{p}}\|I^L(q)-I^R(q-d)\|_2^2, \quad \text{eq. (2)}$$

where $\mathcal{N}_\mathbf{p}$ is a local patch around p. Then a cost volume can be formed by computing the cost on every pixel at every disparity level.

For ECA, the matching cost for pixel p at disparity level d is computed as follows:

$$c_{2D}(p,d)=g_{2D}(f(I^L(p)),f(I^R(p-d))), \qquad \text{Eq. (3)}$$

where f(•) is a feature network to convert images to feature maps, and $g_{2D}$ (•) is matching neural network, such as the matching neural network 130, that computes the matching cost at each disparity level independently. The matching neural network 130 learns a cost when the stereo matching neural network system 100 is trained end-to-end, as described in conjunction with FIGS. 2A and 2B. The stereo matching neural network system 100 performs cost computation and aggregation simultaneously. In contrast, conventional techniques compute the matching cost on patches and use semi-global cost aggregation steps to generate the disparity map.

In an embodiment, the matching neural network 130 is configured to construct a 4D feature volume, and perform 3D convolutions instead of 2D convolutions, to compute the cost volume using Equation (1). However, the ECA technique using the 3D feature volume (feature map pairs 122) has at least two advantages compared with the 4D feature volume. First, all disparity levels are processed independently using the same matching neural network 130. Thus, the cost volume can be constructed in parallel, significantly reducing inference time. Similarly, in a resource-limited scenario, the cost map of each disparity level can be computed sequentially to reduce memory consumption. In comparison, using 2D convolutions instead of 3D convolutions may achieve a 20× speedup compared with using 3D. The drawback for the ECA technique is that accuracy is slightly reduced compared with using the 4D feature volume and 3D convolutions.

Another advantage of ECA is better generalization capability. Because the matching neural network 130 is forced to learn matching costs from color features, and color information from a stereo image pair provides critical information for stereo matching, the matching neural network 130 is less likely to learn spurious associations from training data. In contrast, it is possible for conventional volumetric techniques using a 4D feature volume to learn invalid connections between features and disparities, thus increasing the chance of overfitting. In other words, the volumetric techniques may achieve better performance on one dataset but will likely face a performance drop when tested on unseen datasets.

Figure 1E:
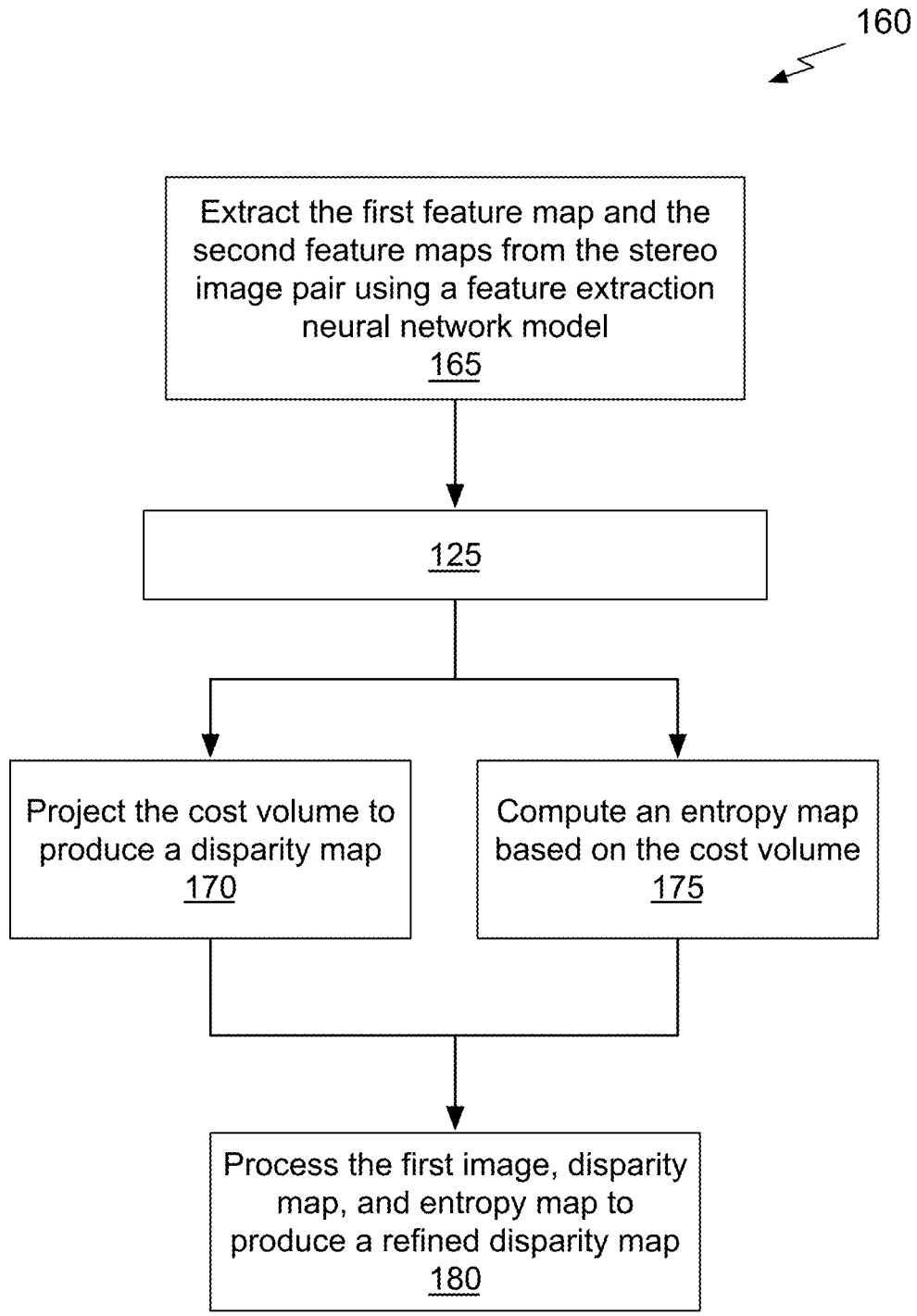
FIG. 1E illustrates another flowchart of the method for generating a disparity map for a stereo image pair, in accordance with an embodiment.

FIG. 1E illustrates a flowchart of a method 160 for generating a disparity map for a stereo image pair, in accordance with an embodiment. Although method 160 is described in the context of a processing unit, the method 160 may also be performed by a program, custom circuitry, or by a combination of custom circuitry and a program. For example, the method 160 may be executed by a GPU (graphics processing unit), CPU (central processing unit), or any processor capable of implementing the stereo matching neural network system 100. Furthermore, persons of ordinary skill in the art will understand that any system that performs method 160 is within the scope and spirit of embodiments of the present invention.

At step 165, the first feature map and the second feature maps are extracted from the stereo image pair using the feature extraction neural network model 110. The method 160 includes steps 135, 140, 145, and 150 from method 125 to process the first feature map and the second feature maps and generate the cost volume. At step 170, the cost volume is projected to produce a disparity map. Step 170 may be performed by a projection layer within the refinement neural network model 120. In an embodiment, the projection layer selects the disparity with the highest matching cost using the soft-argmin operation to generate a disparity. The soft-argmin operation is defined as:

$$\hat{d} := \sum_{d=0}^{D}[d \times \sigma(-c_d)], \qquad \text{Eq. (4)}$$

Where $c_d$ is the matching cost at disparity d, D is the preset maximum disparity level and σ(•) denotes the softmax operator.

At step 175, an entropy map is computed based on the cost volume. The projection layer may also generate the entropy map which reflects the confidence of each pixel. The entropy of each pixel is defined as:

$$h = -\sum_{d=0}^{D} \sigma(-c_d)\log(\sigma(-c_d)). \qquad \text{Eq. (5)}$$

Step 175 may be performed by the refinement neural network model 120. Steps 170 and 175 may be performed in parallel or in sequence. At step 180, the refinement neural network model 120 processes the first image, the disparity map, and the entropy map to produce a refined disparity map 104.

As previously mentioned, the stereo matching neural network system 100 is trained end-to-end. Because each pair of feature maps is processed using the same parameters, the number of parameters and memory requirements are significantly reduced for training compared with a conventional volumetric technique using a 4D feature volume. Similarly, the smaller number of parameters reduces the computation time and memory costs during inference compared with processing a 4D feature map using 3D convolutions. Therefore, refined disparity maps may be generated by the stereo matching neural network system 100 in real time for a sequence of stereo image pairs. For typical stereo images, the stereo matching neural network system 100 generates disparity maps for at least 100 stereo images per second.

Figure 2A:
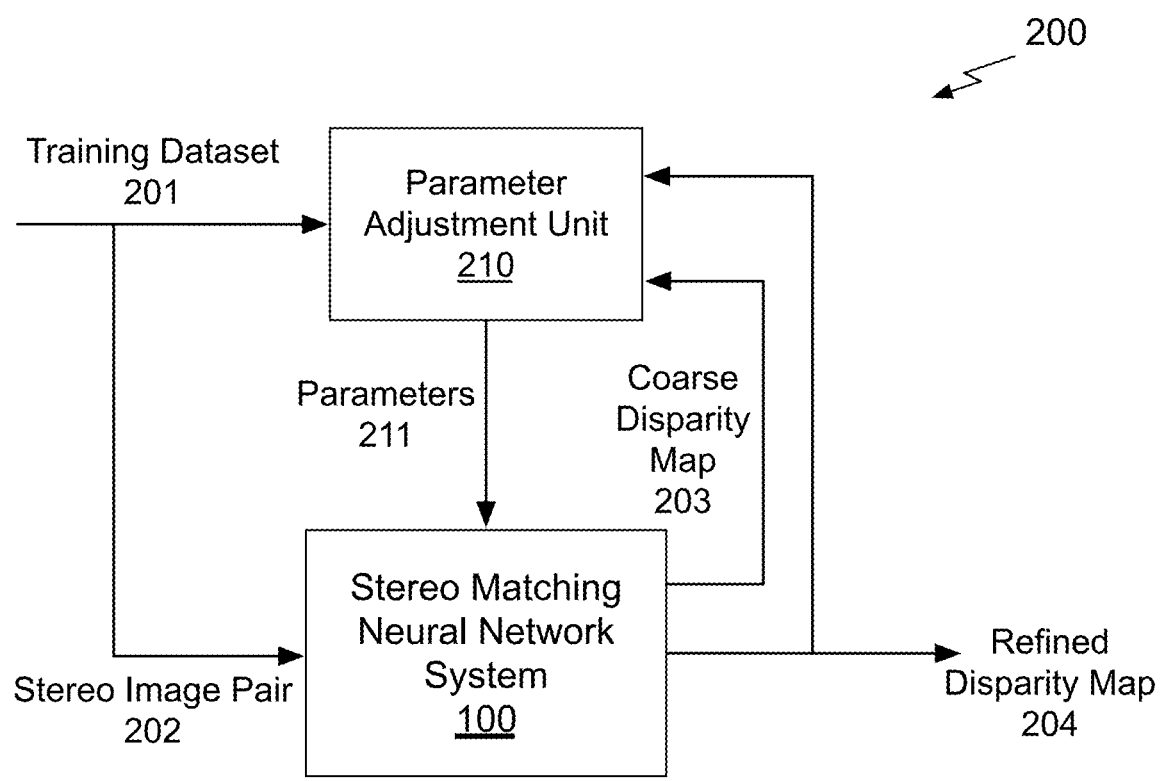
FIG. 2A illustrates a block diagram of a configuration for training the stereo matching neural network system of FIG. 1A, in accordance with an embodiment.

FIG. 2A illustrates a block diagram of a configuration 200 for training the stereo matching neural network system 100 of FIG. 1A, in accordance with an embodiment. The training configuration 200 includes the stereo matching neural network system 100 and a parameter adjustment unit 210. Although the training configuration 200 is described in the context of processing units, one or more of the stereo matching neural network system 100 and the parameter adjustment unit 210 may be performed by a program, custom circuitry, or by a combination of custom circuitry and a program. Furthermore, persons of ordinary skill in the art will understand that any system that performs the operations of the training configuration 200 is within the scope and spirit of embodiments of the present invention.

Parameters 211 of the feature extraction neural network model 110, the cost aggregation neural network model 115, and the refinement neural network model 120 are learned during training of the stereo matching neural network system 100. In an embodiment, the stereo matching neural network system 100 outputs two disparity maps: a coarse prediction $d_{coarse}$ from the soft-argmin operation and a refined prediction $d_{refine}$ from the stereo matching neural network system 100. In an embodiment, supervision is applied to both disparity maps.

A training dataset includes stereo image pairs and corresponding ground truth disparity $d_{gt}$. The stereo matching neural network system 100 processes the stereo image pairs in the training dataset to generate $d_{coarse}$ and $d_{refine}$. The parameter adjustment unit 210 receives $d_{gt}$ and adjusts parameters 211 of the stereo matching neural network system 100 based on errors between $d_{gt}$ and each of $d_{coarse}$ and $d_{refine}$. After training is complete, the parameters 211 are fixed and the stereo matching neural network system 100 may be deployed to perform stereo matching. During deployment the parameter adjustment unit 210 is not used.

The objective for the stereo matching neural network system 100 is to generate coarse disparity map 203 and refined disparity map 204 that match the reference solution $d_{gt}$ as closely as possible. In other words, the objective is to find the vector of all convolutional parameters 211 (e.g., weights and biases) of the stereo matching neural network system 100 that minimizes the error or loss function on the training data without overfitting. Because the choice of loss function can significantly alter the outcome of the training process, the loss function may vary.

The smooth $\ell_1$ loss may be used as the training loss function, which is robust at disparity discontinuities and has low sensitivity to outliers or noise. Given the ground truth disparity $d_{gt}$, the total loss function is defined as:

$$\mathcal{L}_{total} = \ell(d_{coarse} - d_{gt}) + \lambda \ell(d_{refine} - d_{gt}),$$

Where $\lambda = 1.25$, and $$\ell(x) = \begin{cases} 0.5x^2, & |x| < 1 \\ |x| - 0.5, & \text{otherwise} \end{cases}. \quad \text{Eq. (7)}$$

Because the feature map extraction neural network model 110, the cost aggregation neural network model 115, and the refinement neural network model 120 are trained end-to-end together, the loss term is only computed on the disparity maps, and there is no specific loss computed for the cost volume.

Figure 2B:
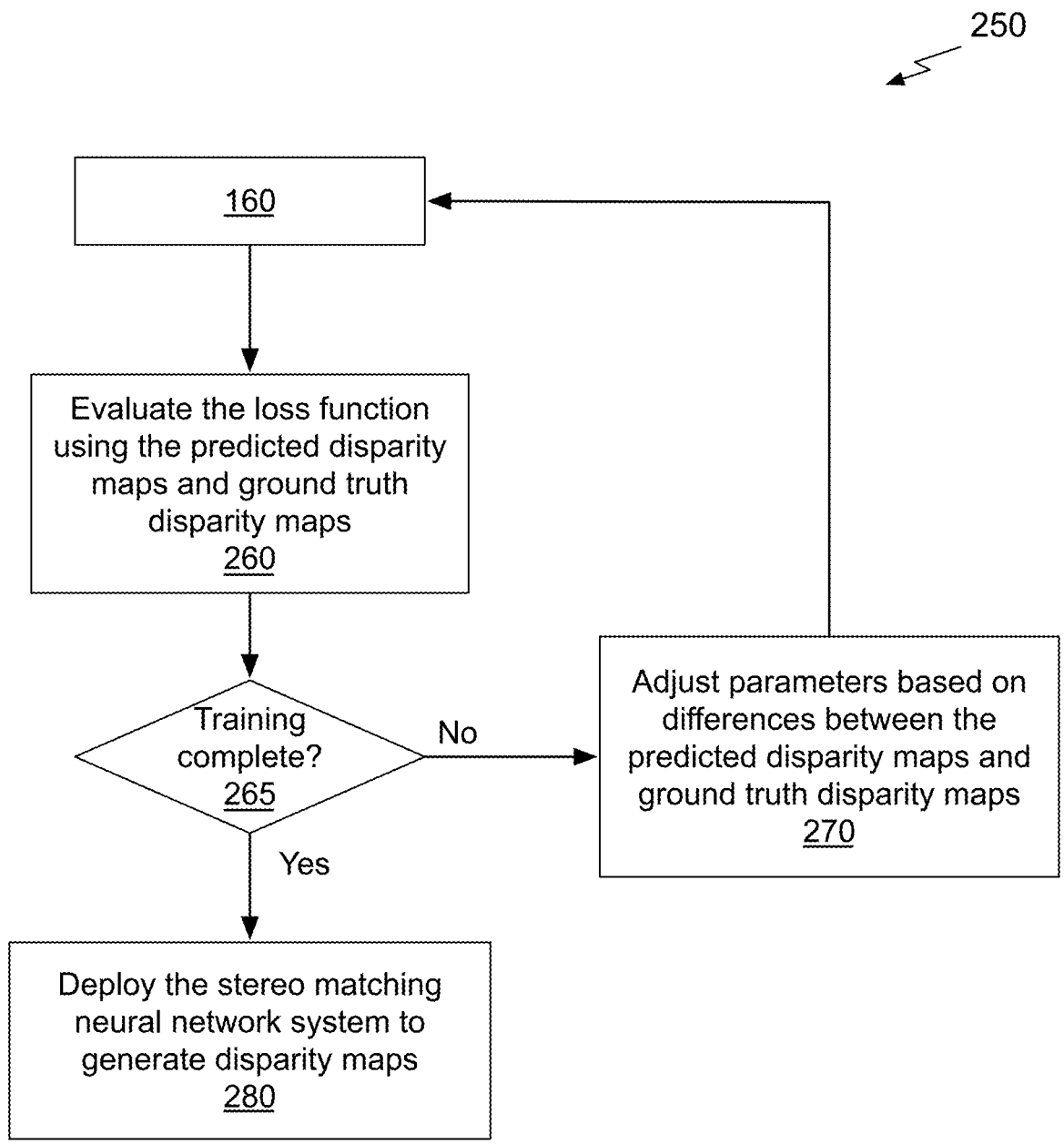
FIG. 2B illustrates a flowchart of a method for training the stereo matching neural network system of FIG. 2A, in accordance with an embodiment.

FIG. 2B illustrates a flowchart of a method 250 for training the stereo matching neural network system 100 of FIG. 1A, in accordance with an embodiment. Although method 250 is described in the context of a processing unit, the method 250 may also be performed by a program, custom circuitry, or by a combination of custom circuitry and a program. For example, the method 250 may be executed by a GPU (graphics processing unit), CPU (central processing unit), or any processor capable of implementing the stereo matching neural network system 100. Furthermore, persons of ordinary skill in the art will understand that any system that performs method 250 is within the scope and spirit of embodiments of the present invention.

The method 250 includes the steps from method 160 for generating (coarse) disparity maps 203 and refined disparity maps 204 from stereo image pairs included in the training dataset. At step 260, the parameter adjustment unit 210 evaluates a loss function, such as the loss function of Eq. (7), using the coarse and refined disparity maps and the ground truth disparity maps.

At step 265, the parameter adjustment unit 210 determines if the training is complete. The loss function measures distances (i.e., differences or gradients) between the ground truth disparity maps and at least one of the coarse and refined disparity maps. The stereo matching neural network system 100 is deemed to be sufficiently trained when at least one of the coarse and refined disparity maps match the ground truth disparity maps or a threshold accuracy is achieved for the training dataset.

If the training is not complete at step 265, then at step 270 the parameter adjustment unit 210 adjusts the parameters 211 based on differences between the ground truth disparity maps and at least one of the coarse and refined disparity maps before returning to step 160 to process additional stereo image pairs. If the training is complete at step 265, then at step 280, the stereo matching neural network system 100 is deployed to generate disparity maps.

Using a 3D efficient cost aggregation volume to produce the disparity maps enables the cost of each disparity shift to be independently computed in parallel using the same matching neural network. The number of parameters and memory requirements for training is reduced, and the time and memory costs during inferencing are also reduced. The encoder-decoder matching neural network 130 learns to match pixels between left-right feature maps to build the cost volume. The projection layer projects the cost volume to a disparity map, which is then processed within an entropy-based refinement neural network model 120. Constraining the matching neural network 130 to focus on the spatial domain allows it to generalize better across multiple datasets than comparable 3D convolution-based techniques for computing cost volumes.

Parallel Processing Architecture

Figure 3:
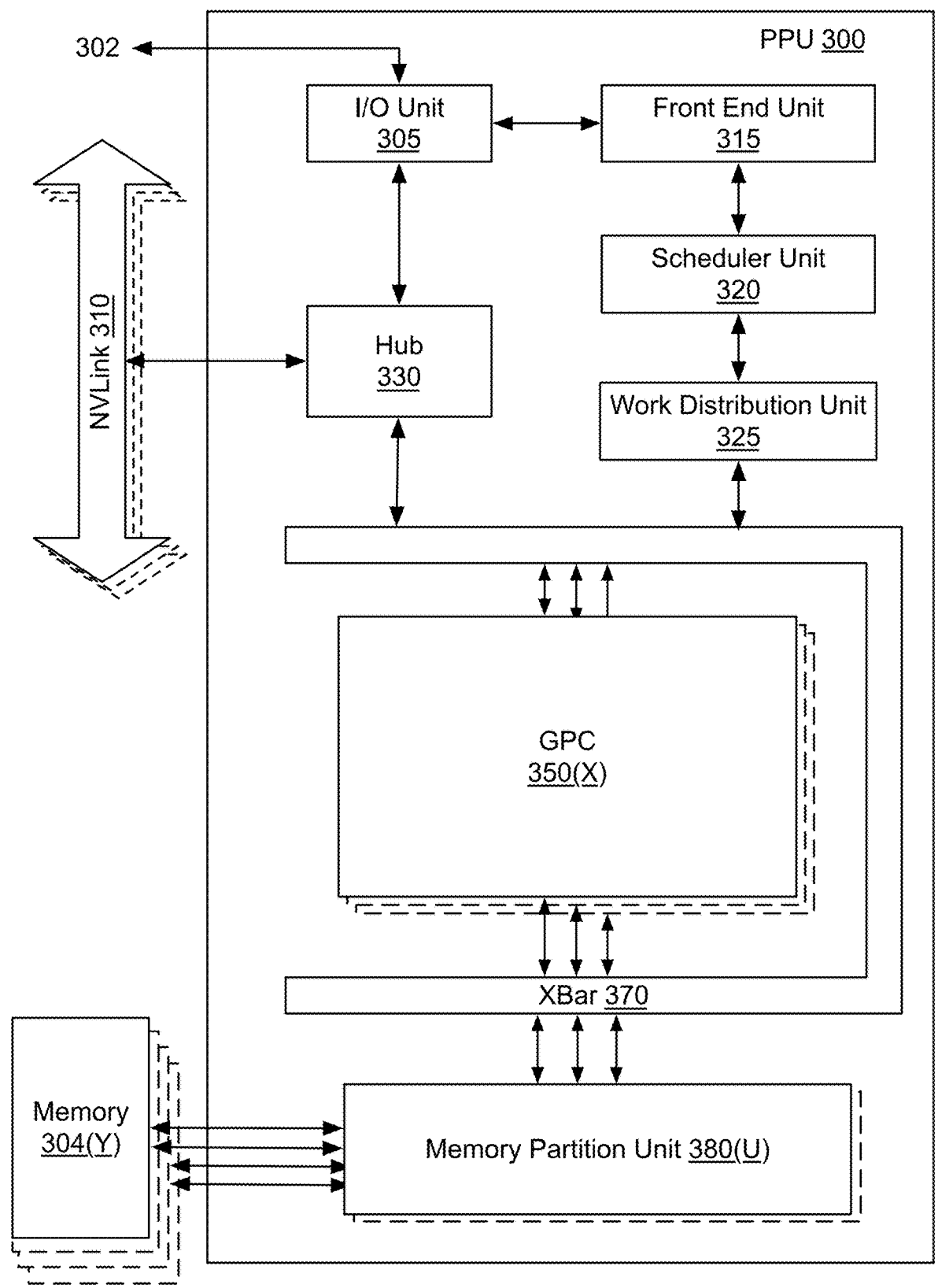
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
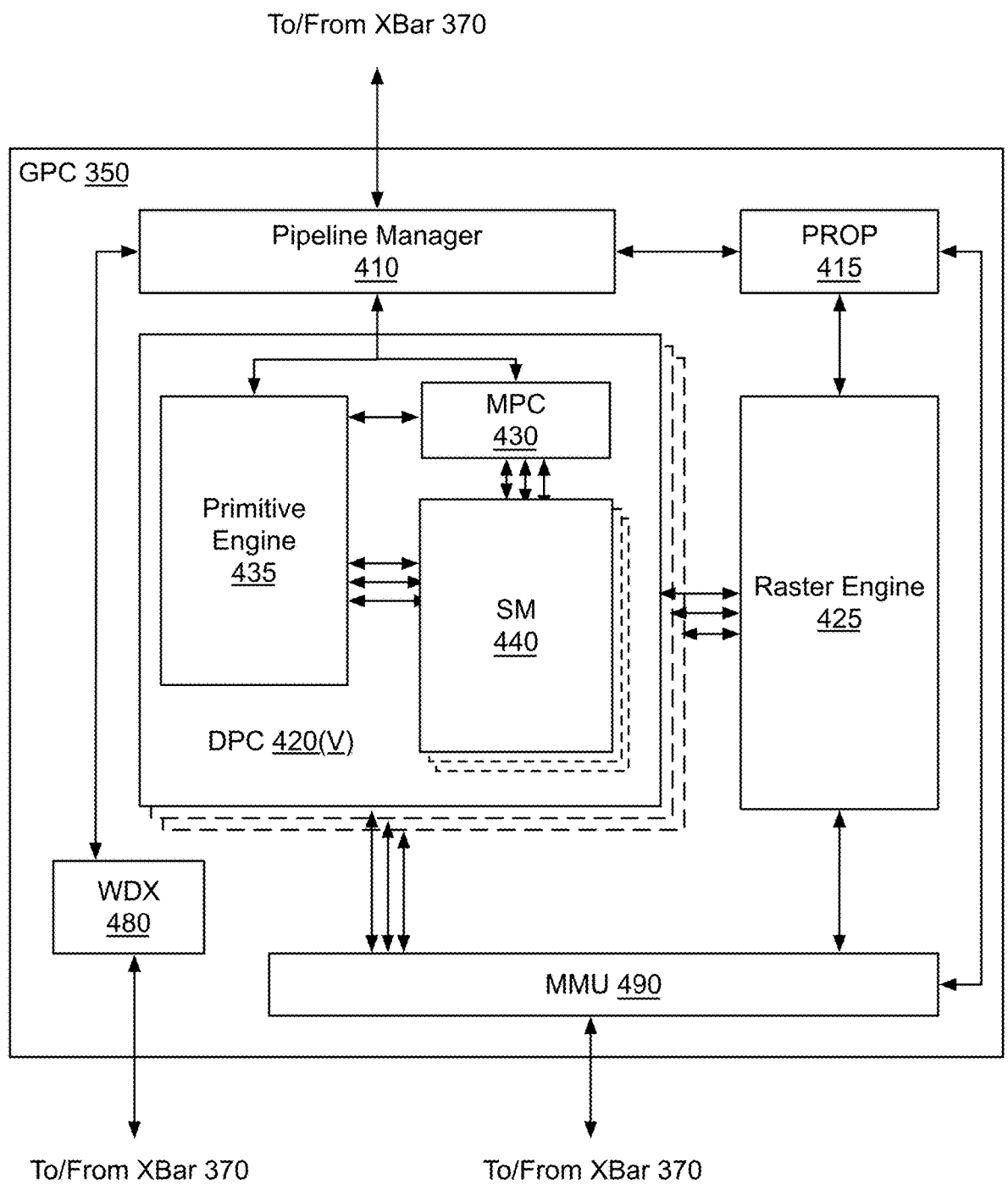
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
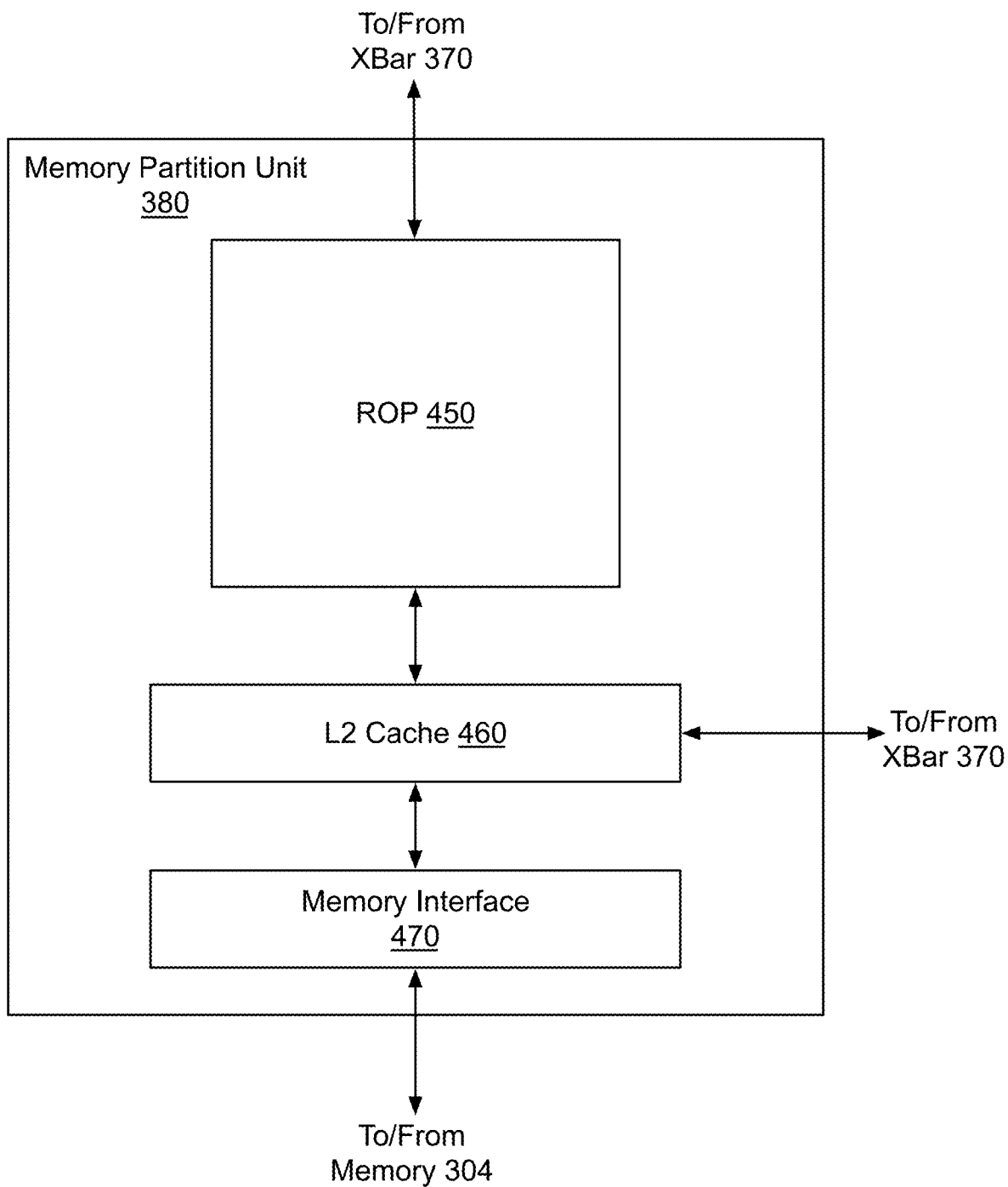
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
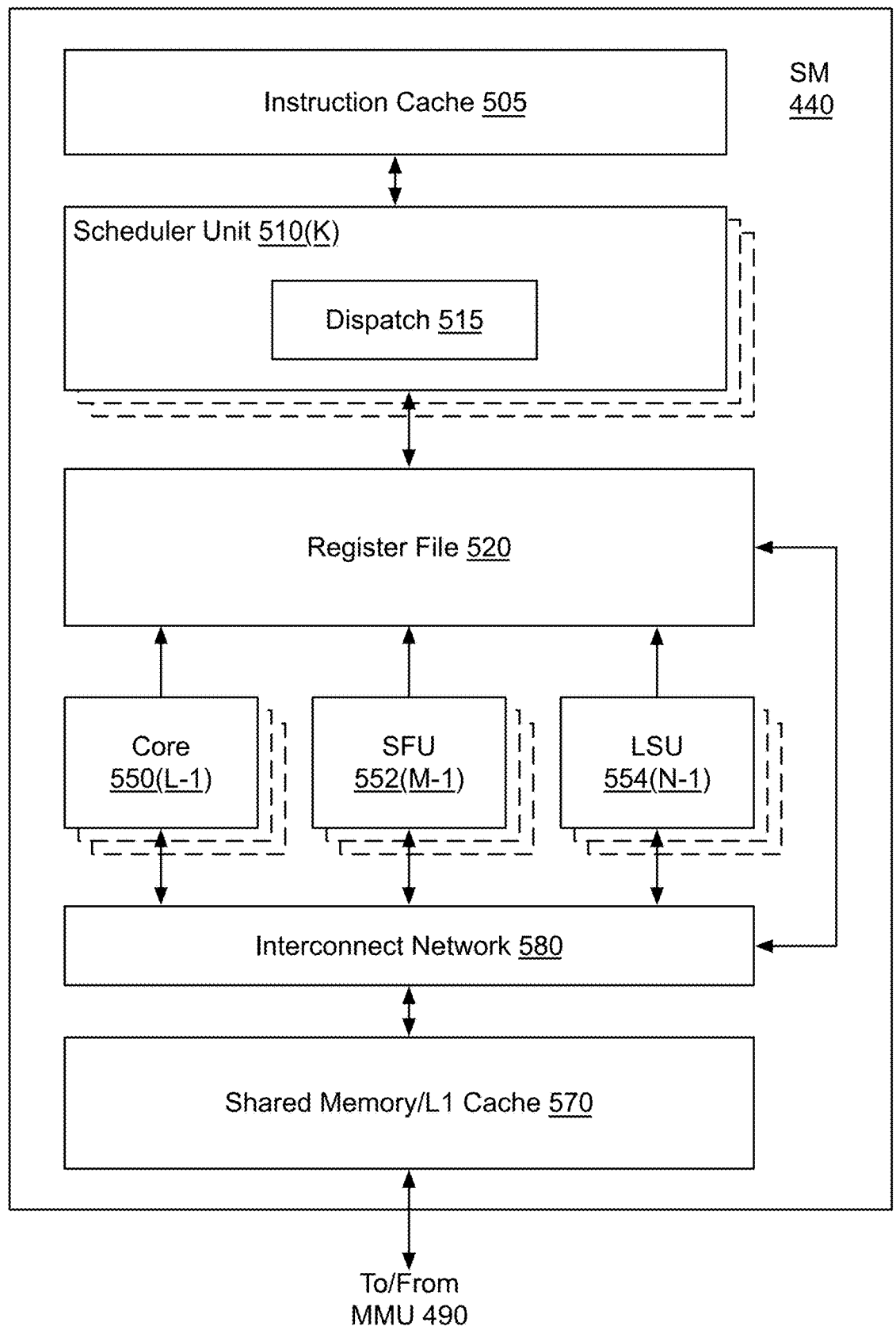
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
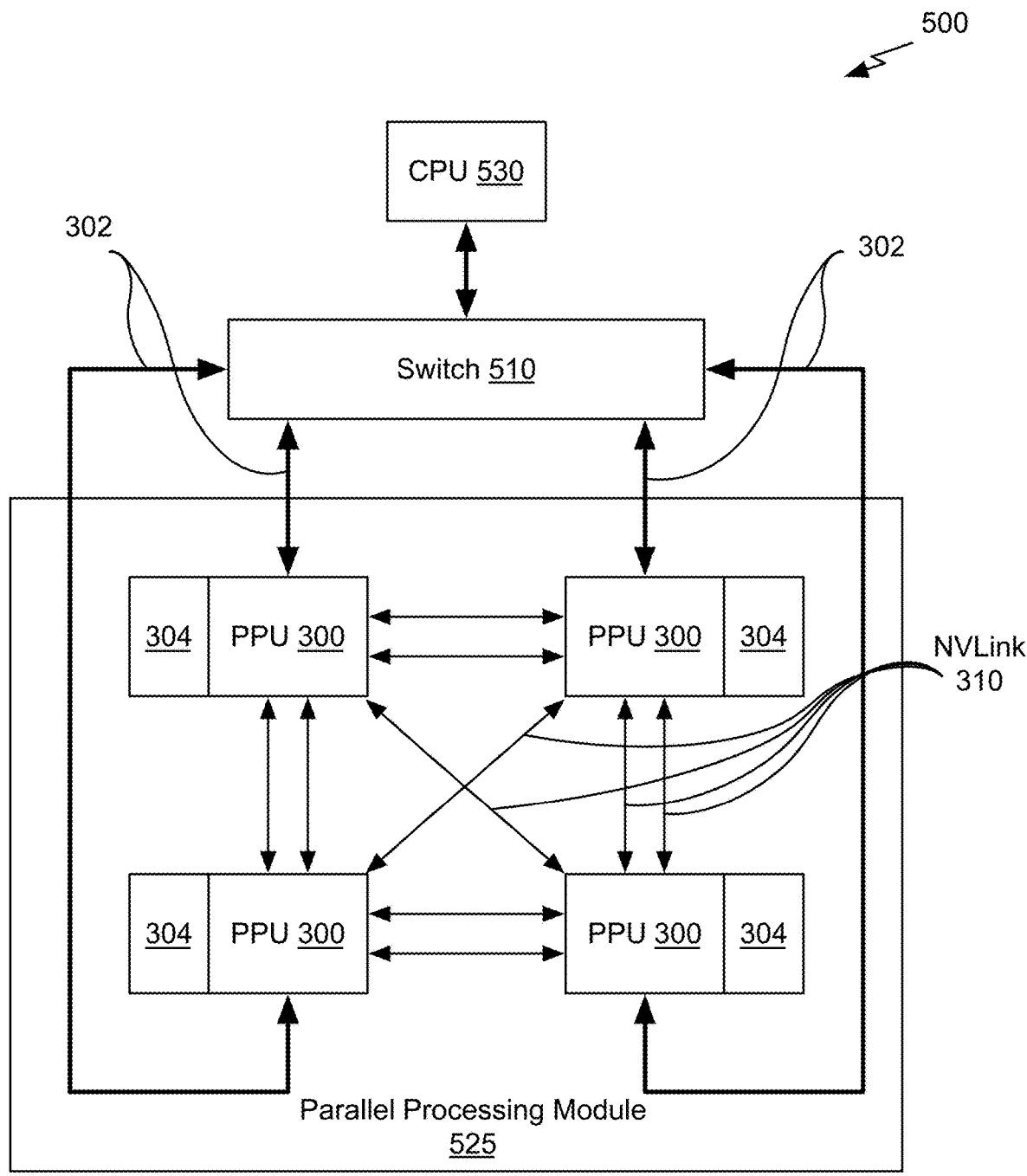
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement one or more of the methods 125, 160, and 250 shown in FIGS. 1D, 1E, and 2B, respectively. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
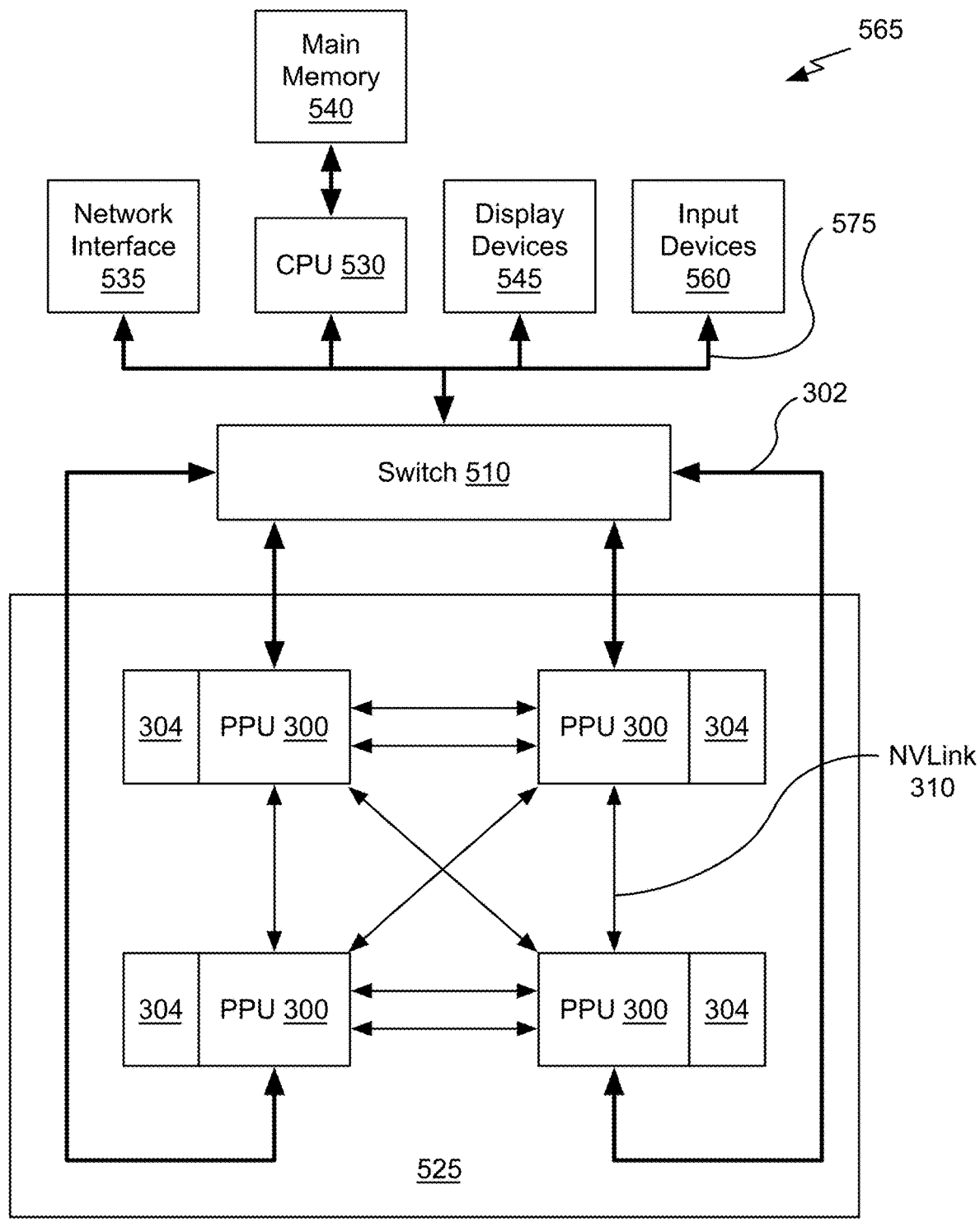
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement one or more of the methods 125, 160, and 250 shown in FIGS. 1D, 1E, and 2B, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving a first feature map extracted from a first image in a stereo image pair;
   receiving second feature maps extracted from a second image in the stereo image pair, each second feature map corresponding to a different disparity level in a set of disparity levels;
   for each disparity level, processing the first feature map and a corresponding second feature map associated with the disparity level of the second feature maps by a matching neural network to produce a cost map for the disparity level; and
   combining the cost maps to produce a cost volume for the stereo image pair.

2. The computer-implemented method of claim 1, wherein processing the first feature map and the corresponding second feature map is performed in parallel for each one of the different disparity levels.

3. The computer-implemented method of claim 1, wherein processing the first feature map and the corresponding second feature map is performed in sequence for each one of the different disparity levels.

4. The computer-implemented method of claim 1, further comprising processing the cost volume by a projection layer to produce a disparity map for the stereo image pair.

5. The computer-implemented method of claim 4, further comprising jointly training the matching neural network and the projection layer to learn parameters used by the matching neural network and the projection layer.

6. The computer-implemented method of claim 4, wherein the projection layer also produces an entropy map indicating a confidence value for each pixel in the first image.

7. The computer-implemented method of claim 4, further comprising processing the disparity map and the entropy map by a refinement neural network to produce a refined disparity map for the stereo image pair.

8. The computer-implemented method of claim 7, further comprising jointly training the matching neural network, the projection layer, and the refinement neural network to learn parameters used by the matching neural network, the projection layer, and the refinement neural network.

9. The computer-implemented method of claim 8, wherein training comprises computing a loss function based on differences between a ground truth disparity map, the disparity map, and the refined disparity map.

10. The computer-implemented method of claim 1, wherein the matching neural network is configured to perform two-dimensional convolution of the first feature map and the corresponding second feature map to match features in the first feature map with features in the corresponding second feature map.

11. The computer-implemented method of claim 1, wherein pixel resolution of the first feature map equals pixel resolution of the first image.

12. The computer-implemented method of claim 1, wherein the cost volume contains costs from only one disparity level in the set of disparity levels.

13. The computer-implemented method of claim 1, further comprising spatially offsetting pixels within the second image for each disparity level in the set of disparity levels to extract the second feature maps.

14. The computer-implemented method of claim 1, wherein the stereo image pair is captured by a stereo camera-based system used for at least one of robotics, drones, autonomous vehicles, intelligent video analytics, augmented reality, virtual reality, or computer aided design (CAD).

15. A system, comprising:
   a memory configured to store stereo image pairs; and
   a processor coupled to the memory and configured as a matching neural network model to:
      receive a first feature map extracted from a first image in a stereo image pair;
      receive second feature maps extracted from a second image in the stereo image pair, each second feature map corresponding to a different disparity level in a set of disparity levels;
      for each disparity level, process the first feature map and a corresponding second feature map associated with the disparity level of the second feature maps by a matching neural network to produce a cost map for the disparity level; and
      combine the cost maps to produce a cost volume for the stereo image pair.

16. The system of claim 15, wherein the matching neural network model is further configured to process the first feature map and the corresponding second feature map in parallel for each one of the different disparity levels.

17. The system of claim 15, wherein the matching neural network model is further configured to process the cost volume by a projection layer to produce a disparity map for the stereo image pair.

18. The system of claim 17, wherein the projection layer also produces an entropy map indicating a confidence value for each pixel in the first image.

19. The system of claim 18, wherein the matching neural network model is further configured to process the disparity map and the entropy map to produce a refined disparity map for the stereo image pair.

20. A non-transitory, computer-readable storage medium storing instructions that, when executed by a processor, cause the processor to:
- receive a first feature map extracted from a first image in a stereo image pair;
- receive second feature maps extracted from a second image in the stereo image pair, each second feature map corresponding to a different disparity level in a set of disparity levels;
- for each disparity level, process the first feature map and a corresponding second feature map associated with the disparity level of the second feature maps by a matching neural network to produce a cost map for the disparity level; and
- combine the cost maps to produce a cost volume for the stereo image pair.

\* \* \* \* \*